United States Patent
Conway et al.

(10) Patent No.: US 11,522,345 B2
(45) Date of Patent: Dec. 6, 2022

(54) INTERNAL COMBUSTION ENGINE HAVING DEDICATED EGR CYLINDER(S) AND AIR-ASSISTED SPARK IGNITION

(71) Applicant: Southwest Research Institute, San Antonio, TX (US)

(72) Inventors: Graham T Conway, San Antonio, TX (US); Barrett Mangold, Hondo, TX (US); Yanyu Wang, Helotes, TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 17/234,376

(22) Filed: Apr. 19, 2021

(65) Prior Publication Data
US 2021/0324785 A1 Oct. 21, 2021

Related U.S. Application Data

(60) Provisional application No. 63/011,507, filed on Apr. 17, 2020, provisional application No. 63/127,258, filed on Dec. 18, 2020.

(51) Int. Cl.
| | |
|---|---|
| *F02M 35/10* | (2006.01) |
| *H01T 13/32* | (2006.01) |
| *F02B 19/12* | (2006.01) |
| *F02M 26/17* | (2016.01) |
| *F02M 26/14* | (2016.01) |

(52) U.S. Cl.
CPC .............. *H01T 13/32* (2013.01); *F02B 19/12* (2013.01); *F02M 26/14* (2016.02); *F02M 26/17* (2016.02); *F02M 35/10222* (2013.01)

(58) Field of Classification Search
CPC ......... F02B 19/12; F02B 17/00; F02M 26/14; F02M 26/17; F02M 35/10222; F02M 2023/008; F02M 26/43; H01T 13/32; Y02T 10/12
See application file for complete search history.

(56) References Cited

U.S. PATENT DOCUMENTS

| | | | | |
|---|---|---|---|---|
| 2,465,092 A | * | 3/1949 | Harkness | F02C 7/266 60/39.827 |
| 2,625,921 A | * | 1/1953 | Van Ry | H01T 13/16 123/169 V |
| 8,925,518 B1 | * | 1/2015 | Riley | F02D 41/0027 123/304 |
| 9,797,287 B2 | * | 10/2017 | Bartley | B01D 53/945 |
| 11,060,443 B1 | * | 7/2021 | Thomas | F02D 41/3005 |
| 2018/0223777 A1 | * | 8/2018 | Gukelberger | F02M 26/43 |

* cited by examiner

*Primary Examiner* — Hung Q Nguyen
(74) *Attorney, Agent, or Firm* — Livingston Law Firm

(57) ABSTRACT

A method of assisting ignition of a dedicated exhaust gas recirculation (D-EGR) cylinder in a spark-ignited internal combustion engine. The spark igniter has an internal air passage that receives pressurized air and carries the pressurized air down to an exit port in the vicinity of the spark gap of the igniter.

16 Claims, 6 Drawing Sheets

INTERNAL COMBUSTION ENGINE HAVING DEDICATED EGR CYLINDER(S) AND AIR-ASSISTED SPARK IGNITION

PRIORITY DATE INFORMATION

This patent application claims the benefit of U.S. Provisional Patent App. No. 63/011,507, filed Apr. 17, 2021, and U.S. Provisional Patent App. No. 63/127,258, filed Dec. 18, 2020.

TECHNICAL FIELD OF THE INVENTION

This patent application relates to internal combustion engines, and more particularly to such engines having one or more cylinders dedicated to production of recirculated exhaust.

BACKGROUND OF THE INVENTION

In an internal combustion engine system having dedicated EGR (exhaust gas recirculation), one or more cylinders of the engine are segregated and dedicated to operate in a rich combustion mode. Because of the rich combustion, the exhaust gases from the dedicated cylinder(s) have increased levels of hydrogen and carbon monoxide. Rich combustion products such as these are often termed "syngas" or "reformate".

Dedicated EGR engines use the reformate produced by the dedicated cylinder(s) in an exhaust gas recirculation (EGR) system. The hydrogen-rich reformate is ingested into the engine for subsequent combustion by the non-dedicated cylinders and optionally by the dedicated cylinder(s). The reformate is effective in increasing knock resistance and improving dilution tolerance and burn rate. This allows a higher compression ratio to be used with higher rates of EGR and reduced ignition energy, leading to higher efficiency and reduced fuel consumption.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to systems and methods for a vehicle, such as an automobile, having an engine with one or more dedicated EGR (D-EGR) cylinders. A D-EGR cylinder can operate at any equivalence ratio because, when its exhaust is recirculated, that exhaust will never exit the engine before passing through another cylinder operating at an air-fuel ratio for which the vehicle's exhaust aftertreatment system is designed. This allows the D-EGR cylinder to run rich, which produces hydrogen (H2) and carbon monoxide (CO) at levels that enhance combustion flame speeds, combustion, and knock tolerance of all the cylinders.

Dedicated EGR System with Air-Injection via Spark Igniter

Figure 1:
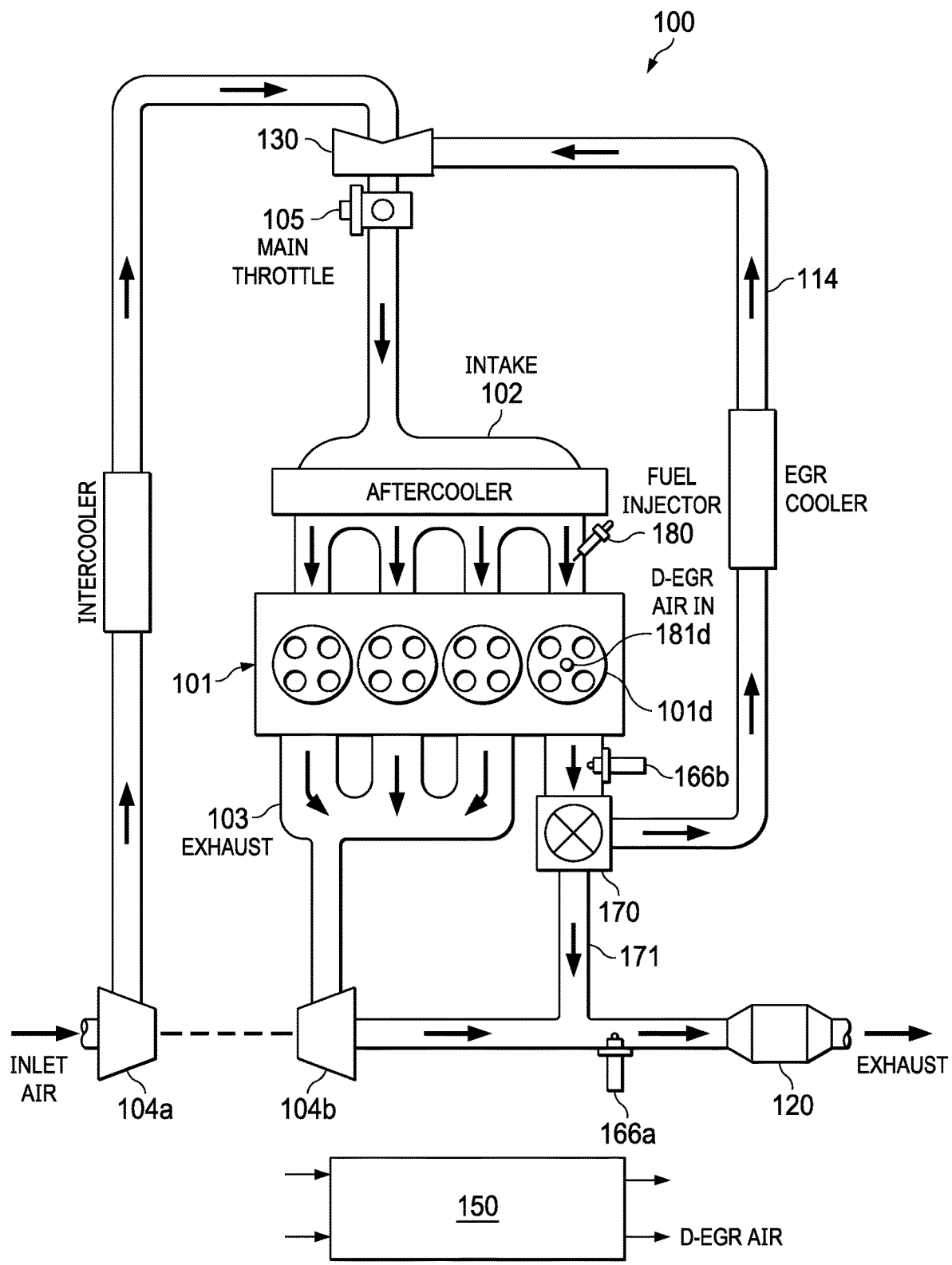
FIG. 1 illustrates a four-cylinder engine with one dedicated EGR cylinder, and a shared intake manifold.

FIG. 1 illustrates an internal combustion engine 100 having four cylinders 101. One of the cylinders is a dedicated EGR cylinder, and is identified as cylinder 101*d*. In the example of FIG. 1, engine 100 is gasoline-fueled and spark-ignited, with each cylinder 101 having an associated spark plug 181.

The dedicated EGR cylinder 101*d* may be operated at any desired air-fuel ratio. All of its exhaust may be recirculated back to the intake manifold 102.

In the embodiment of FIG. 1, the other three cylinders 101 (referred to herein as the "main" or "non dedicated" cylinders) are operated at a stoichiometric air-fuel ratio. Their exhaust is directed to an exhaust aftertreatment system via an exhaust manifold 103.

Engine 100 is equipped with a turbocharger, specifically a compressor 104*a* and a turbine 104*b*.

Although not explicitly shown, all cylinders 101 have a fuel delivery system for introducing fuel into the cylinders. For purposes of this description, the fuel delivery system is assumed to be consistent with gasoline direct injection, and each cylinder 101 is equipped with a fuel injector 180. It is assumed that the fuel injector timing, as well as the amount of fuel injected, for the main cylinders can be controlled independently of the fuel injector timing and fuel amount for the dedicated EGR cylinder(s).

In the example of this description, the EGR loop 114 joins the intake line downstream the compressor 104*a*. A mixer 130 mixes the fresh air intake with the EGR gas. A main throttle 105 is used to control the amount of intake (fresh air and EGR) into the intake manifold 102.

In the embodiment of this description, a three-way valve 170 controls the flow of dedicated EGR to the EGR loop or to the exhaust system. Valve 170 may be used to divert all or some of the EGR from the EGR loop 114 to a bypass line 171 that connects to the exhaust line, downstream the turbine 104*b* and upstream the three-way catalyst 120. Other configurations for controlling EGR flow are possible, such as an EGR valve just upstream of mixer 130.

The four-cylinder dedicated EGR system 100 with a single dedicated cylinder can provide a 25% EGR rate. In other dedicated EGR systems, there may be a different number of engine cylinders 101, and/or there may be more than one dedicated EGR cylinder 101*d*. In general, in a dedicated EGR engine configuration, the exhaust of a sub-group of cylinders can be routed back to the intake of all the cylinders, thereby providing EGR for all cylinders. In some embodiments, the EGR may be routed to only the main cylinders.

After entering the cylinders 101, the fresh-air/EGR mixture is ignited and combusts. After combustion, exhaust gas from each cylinder 101 flows through its exhaust port and into exhaust manifold 103. From the exhaust manifold 103, exhaust gas then flows through turbine 104*b*, which drives compressor 104*a*. After turbine 104*b*, exhaust gas flows out to a main exhaust line 119 to a three-way catalyst 120, to be treated before exiting to the atmosphere.

As stated above, the dedicated EGR cylinder 101*d* can operate at any equivalence ratio because its recirculated exhaust will not exit the engine before passing through a non-dedicated EGR cylinder 101 operating at a stoichiometric air-fuel ratio. Because only stoichiometric exhaust leaves the engine, the exhaust aftertreatment device 120 may be a three-way catalyst.

To control the air-fuel ratio, exhaust gas may be sampled by an exhaust gas oxygen (EGO) sensor. Both the main exhaust line 122 and the EGR loop 114 may have a sensor (identified as 166*a* and 166*b*), particularly because the dedicated EGR cylinder may be operated at a different air-fuel ratio than non-dedicated cylinders.

If a dedicated EGR cylinder is run rich of stoichiometric A/F ratio, a significant amount of hydrogen (H2) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as improving low speed peak torque results, due to increased EGR tolerance and the knock resistance provided by hydrogen (H2) and carbon monoxide (CO).

An EGR control unit 150 has appropriate hardware (processing and memory devices) and programming for controlling the EGR system. It may be incorporated with a larger more comprehensive control unit. Regardless of division of tasks, it is assumed there is control to receive data from any sensors described herein, and perform various EGR control algorithms. Control signals are generated for the various valves and other actuators of the EGR system. Fuel delivery is controlled such that the dedicated EGR cylinder may operate at an equivalence ratio greater than that of the main cylinders.

Figure 2:
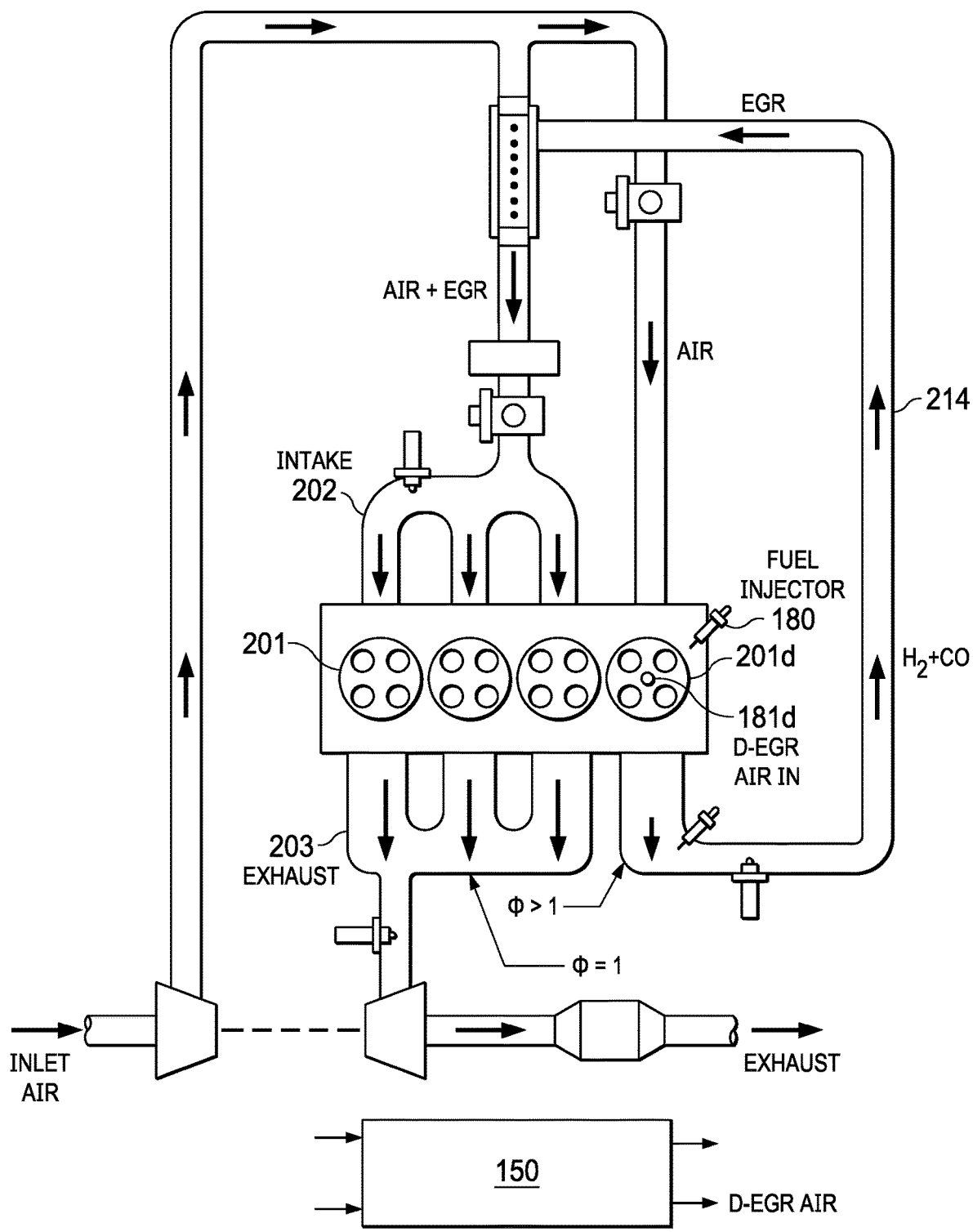
FIG. 2 illustrates a four-cylinder engine with one dedicated EGR cylinder, and a split intake manifold.

FIG. 2 illustrates a "split intake manifold" D-EGR engine 200. As illustrated, the main cylinders 201 share intake manifold 102, which mixes fresh air and EGR from EGR loop 214. Thus, only the main cylinders 201 receive exhaust gas from the D-EGR cylinder 201*d*. The D-EGR cylinder 201*d* does not receive EGR, but rather receives only fresh air.

D-EGR engine 200 does not have bypass valve 170 or bypass line 171 but is otherwise similar in structure and design to D-EGR engine 100.

Referring to both FIGS. 1 and 2, each D-EGR cylinder 101*d* or 201*d* has a spark igniter 181*d*. This could be a spark plug, or any other sort of device that delivers an ignition spark to the combustion chamber of the cylinder, modified as explained herein.

In accordance with the invention and as described in detail below, the spark igniter 181*d* is configured with an air passage for delivering air into the vicinity of the spark gap. The result is air-assisted ignition of the D-EGR cylinder.

Air-Injected Spark Plug

Figure 3:
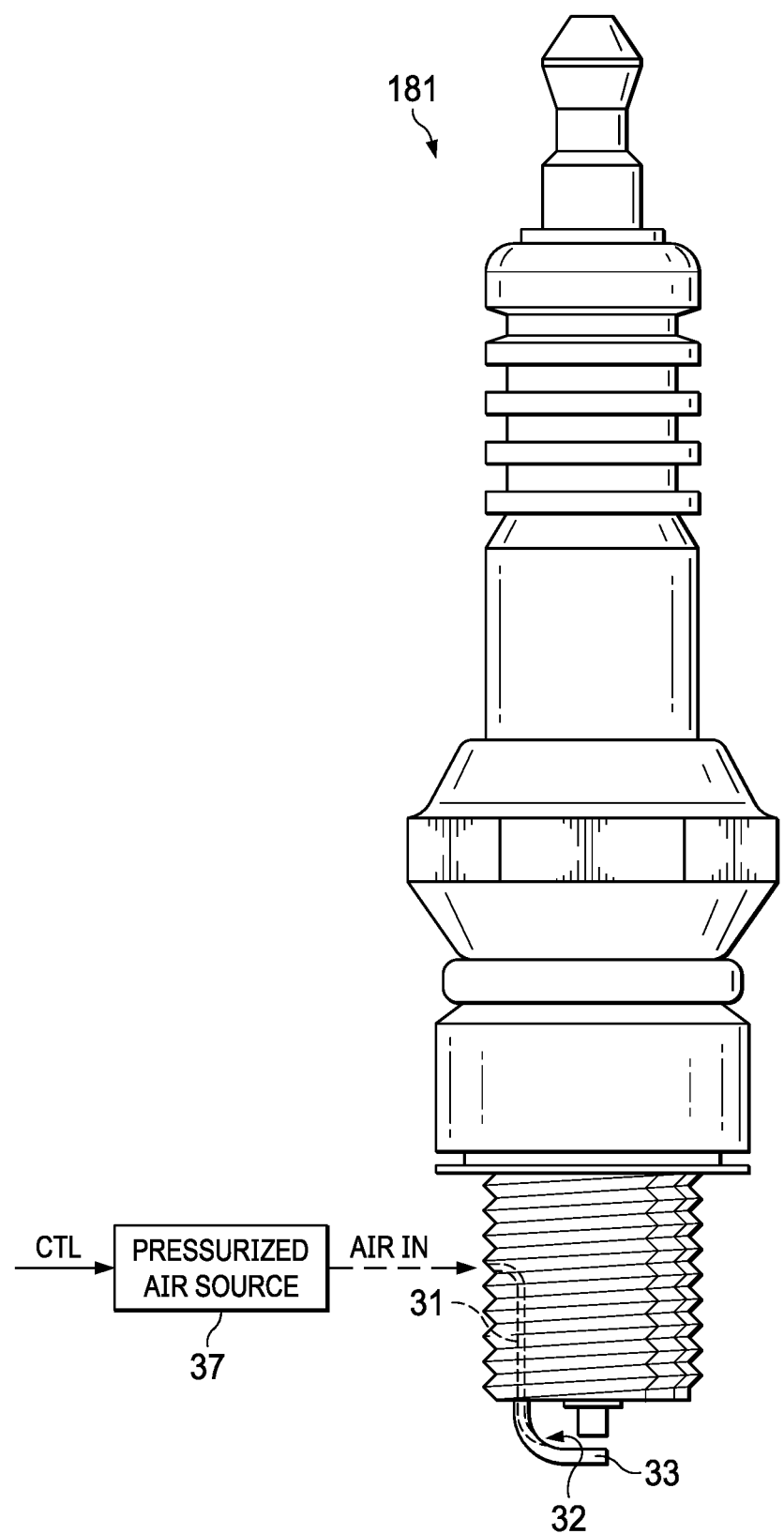
FIG. 3 illustrates an air-injected spark igniter in accordance with the invention.

FIG. 3 illustrates a spark igniter 181*d*, suitable for installation in a D-EGR cylinder in accordance with the invention. In the example of FIG. 3, the spark igniter is similar to a conventional spark plug, but with the addition of an air passage 31 from which pressurized air enters and flows to an exit port 32 in the vicinity of the spark gap.

In the example of FIG. 3, the air passage 31 enters the spark igniter body in the thread region 34. The passage 31 continues through the thread region 34 and through the ground electrode 33. In other embodiments, air passage 31 could enter at some other entry point on the spark igniter, such as an entry point into the body of the spark igniter closer to the terminal end. The air passage follows a path down the spark igniter. The air passage passes partially through the ground electrode. The exit port 32 of the air passage 31 is on the inner curve of the ground electrode 33.

Figure 4:
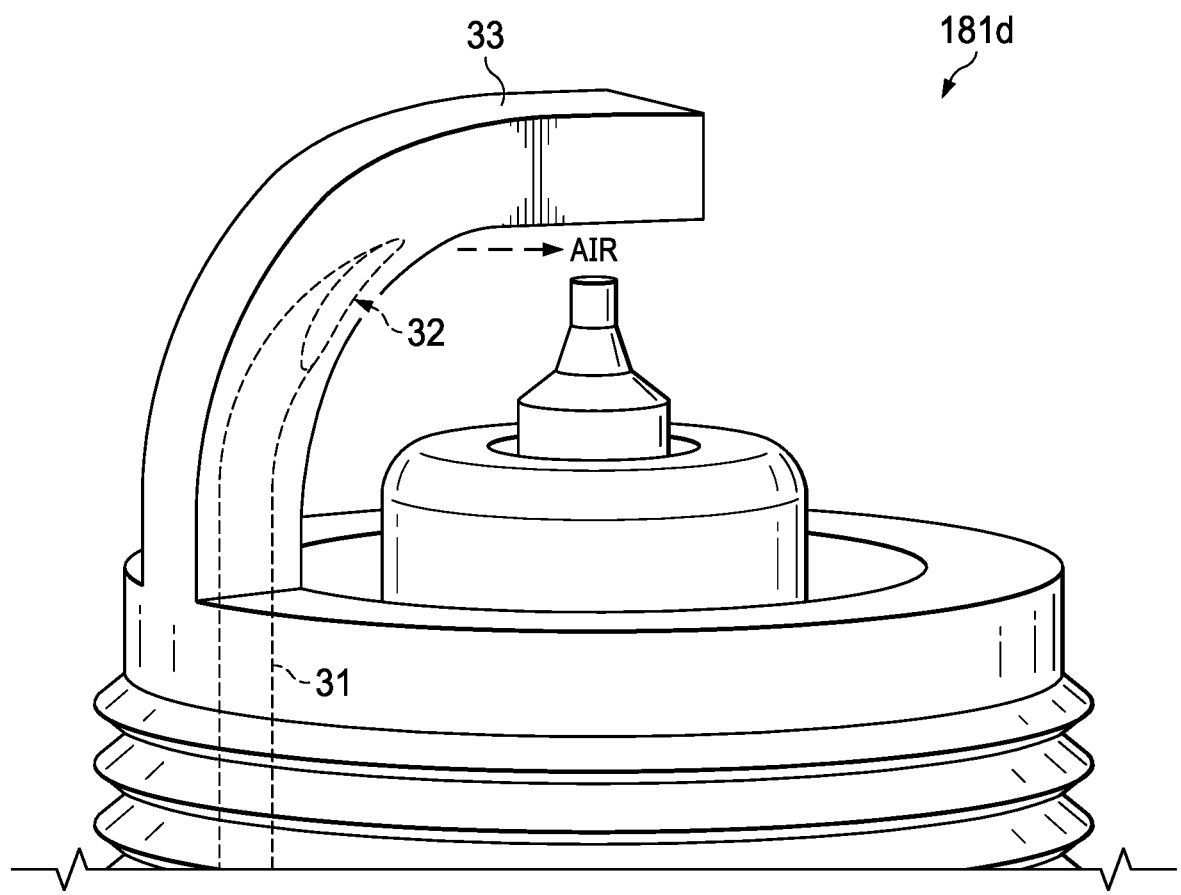
FIG. 4 illustrates the entry of air into the spark gap using the spark igniter of FIG. 3.

FIG. 4 illustrates the spark gap in further detail. Air passage 31 is internal to the ground electrode 33. The exit port 32 of the air passage 31 is positioned so that pressurized air may enter the spark gap area.

Figure 5:
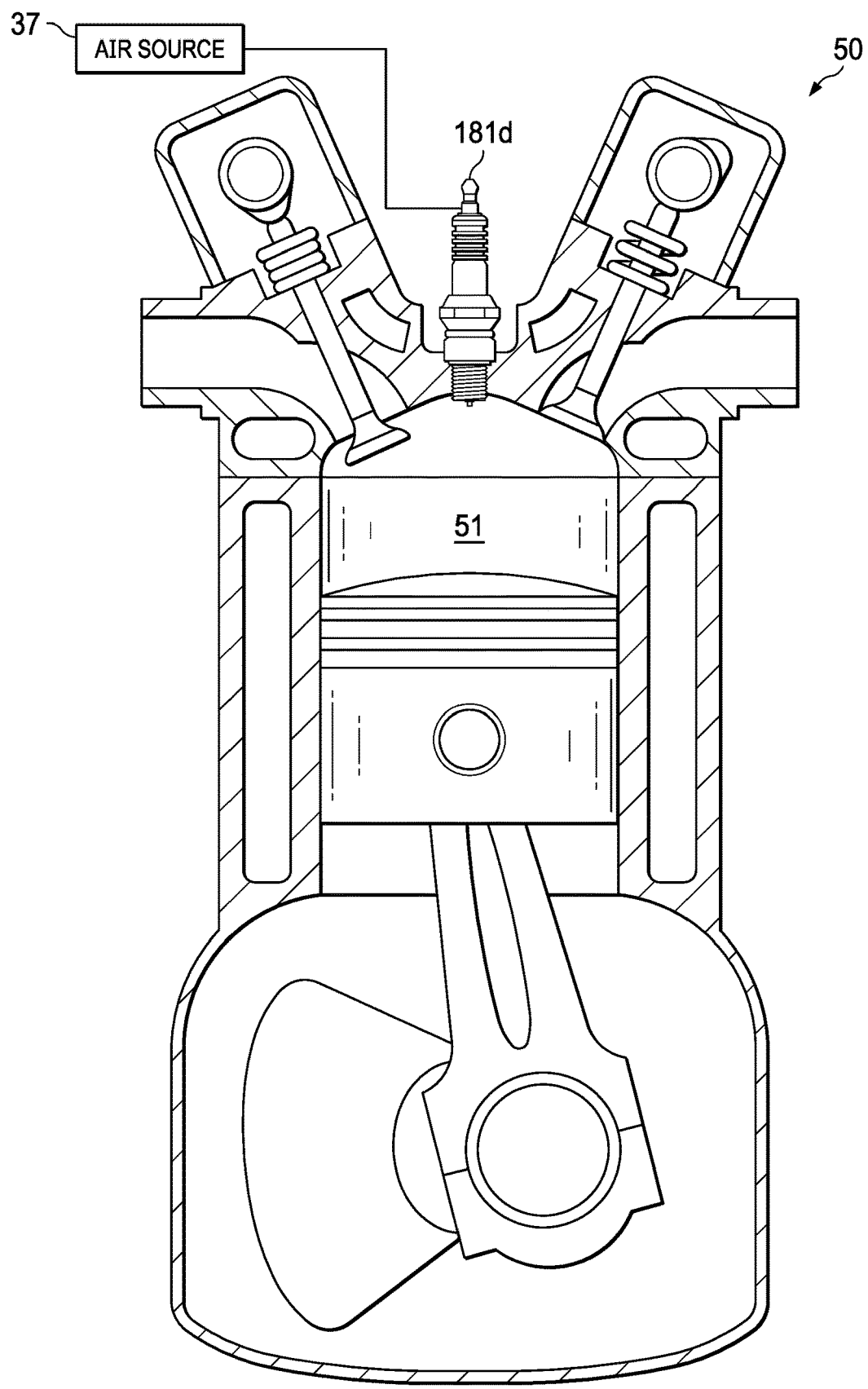
FIG. 5 illustrates the spark igniter of FIGS. 3 and 4 installed in an engine cylinder of an internal combustion engine.

FIG. 5 illustrates the spark igniter 181*d* of FIGS. 3 and 4 installed in an engine cylinder 50 of an internal combustion engine. Pressurized air enters into the spark igniter 181*d* via an entry port, follows an air passage down through the body of the spark igniter, and enters the combustion chamber 51 at a desired time during the engine cycle.

In operation, air is delivered into the spark gap at a pressure greater than the D-EGR cylinder pressure. The delivery of this spark-assist air is specifically timed. The injection will occur at some point in time prior to ignition such that by the time of ignition, the air-fuel mixture is improved. The air reduces local enrichment at the spark electrode, and thereby aids in ignition. More specifically, the air injection reduces the air-fuel mixture homogeneity to an ignitable level. It is expected that this spark-assist air will be delivered several milliseconds prior to ignition and most likely 1-2 milliseconds.

Because ignition is only locally air-assisted in the vicinity of the spark gap, the overall air-fuel mixture in the cylinder can be rich as desired for D-EGR operation. The result is increased reformate yield and further improvement in engine efficiency.

Air-Injected Spark Plug with Pre-Chamber

Figure 6:
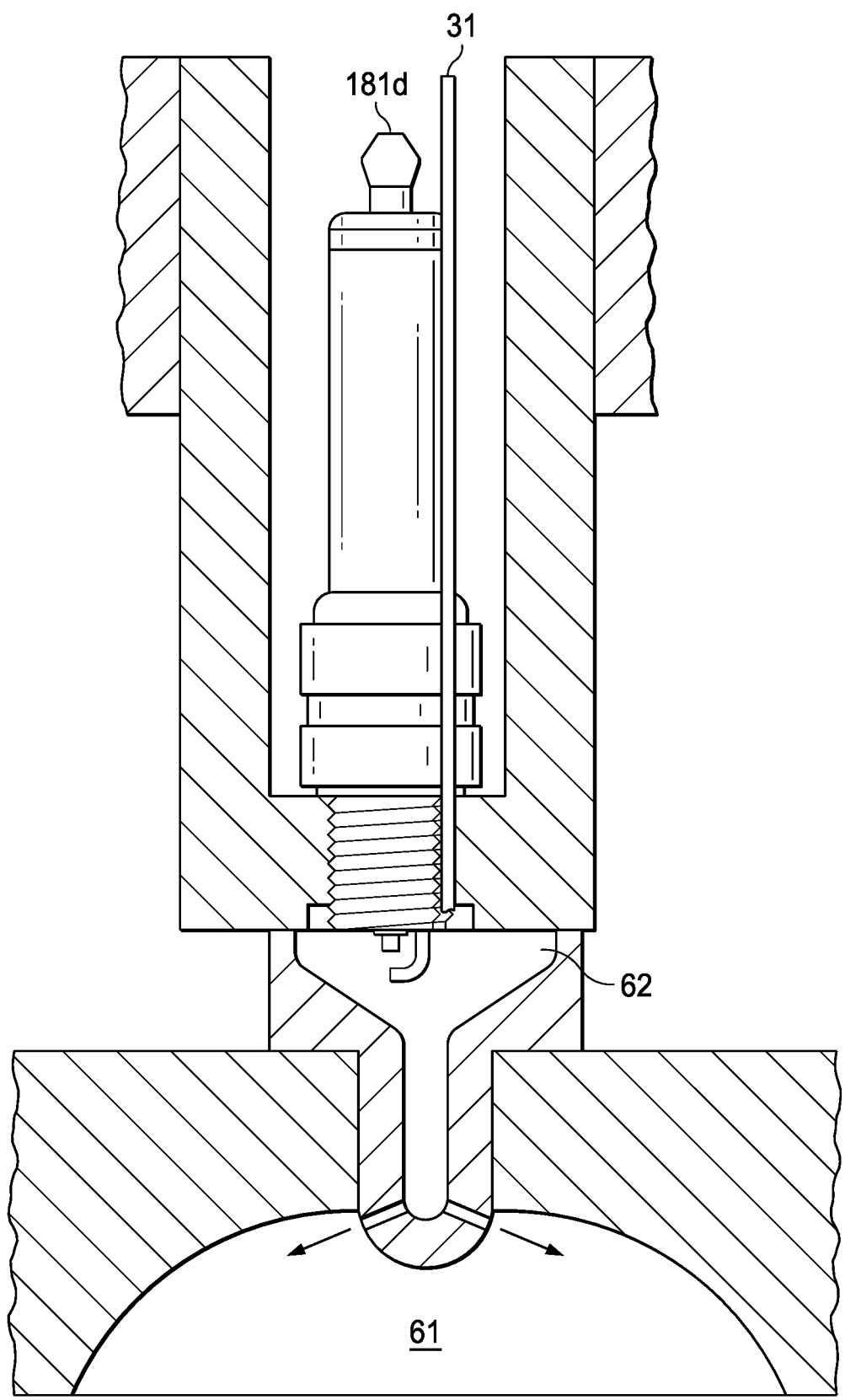
FIG. 6 illustrates the spark igniter installed in a cylinder having a combustion pre-chamber into which the spark end of the spark plug is inserted.

FIG. 6 illustrates the spark igniter 181*d* installed in a cylinder (represented as combustion chamber 61) having a combustion pre-chamber 62 surrounding the spark gap end of the spark igniter. This results in the air passage 31 delivering air into the pre-chamber 62.

Various configurations are possible for pre-chamber 62. Its walls may be attached to the bottom of a spark igniter, or its walls may be added to the top of the combustion chamber. In either case, the pre-chamber encloses the spark gap except for an opening into the combustion chamber at the bottom of the pre-chamber.

In operation, air is delivered into the spark gap via passage 31 and into pre-chamber 62 at a pressure greater than the D-EGR cylinder pressure. The delivery of this pressurized air is specifically timed to occur at some point so as to purge the pre-chamber volume of exhaust residuals from the previous ignition cycle. Residual gas trapped in the pre-chamber 62 exits into the main combustion chamber 61.

This provides a more ignitable mixture of air and fuel, which in turn enables the D-EGR cylinder to be run with an increased equivalence ratio. The result is an increase in reformate yield.

Engine Control

Referring again to the D-EGR engines of FIGS. 1 and 2, control unit 150 has special programming to implement the air-assisted ignition. During the spark event, a control signal is delivered to a source of pressurized air, which delivers air to the spark gap via passage 31.

As shown in FIGS. 3, 5 and 6 the pressurized air source 37 is controlled to deliver air to spark igniter 181*d* at a desired time and for a desired duration. Various sources for pressurized air may be used, with one example being a compressor driven by the engine.

What is claimed is:

1. A method of assisting ignition of a dedicated exhaust gas recirculation (D-EGR) cylinder in a spark-ignited internal combustion engine, the D-EGR cylinder having a combustion chamber, comprising:
provonding the D-EGR cylinder with a spark plug having a body portion to which a ground electrode is attached and having an air passage within at least a portion of the body portion for receiving pressurized air and carrying the pressurized air within the spark plug;
wherein the spark plug has a spark gap within the combustion chamber;
wherein the air passage has an exit port in the vicinity of the spark gap of the spark plug; and
providing the pressurized air into the spark gap via the air passage prior to ignition events.

2. The method of claim 1, wherein the spark gap is between a center electrode and the ground electrode, and wherein the air passage is also at least partly within the ground electrode and exits the ground electrode via the exit port.

3. The method of claim 2, wherein the ground electrode has a curved portion at the spark gap and the exit port is on an inner side of the curved portion.

4. The method of claim 1, wherein the spark plug has a threaded portion of the body portion and wherein the air passage enters the spark plug through the threaded portion via an inlet port.

5. The method of claim 1, further comprising providing a pre-chamber surrounding the spark gap.

6. The method of claim 1, wherein the providing the pressurized air step is performed within several milliseconds prior to the ignition events.

7. An improved spark igniter, the spark igniter having at least a body, a terminal at a first end of the body, a center electrode running through the body to a second end of the body, and a ground electrode also at the second end of the body, comprising:
an air passage running through at least a portion of the body and continuing through at least a portion of the ground electrode, the air passage having an inlet port for receiving pressurized air and having an exit port for expelling the pressurized air into a spark gap between the center electrode and the ground electrode.

8. The spark igniter of claim 7, wherein the ground electrode has a curved portion at the spark gap and the exit port is on an inner side of the curved portion.

9. The spark igniter of claim 7, wherein the spark igniter has a threaded portion of the body and wherein the air passage enters the spark igniter through the threaded portion via the inlet port.

10. The spark igniter of claim 7, further comprising a pre-chamber surrounding the spark gap.

11. An improved internal combustion engine, comprising:
at least one D-EGR (dedicated exhaust gas recirculation) cylinder, with the remainder of a plurality of cylinders of the internal combustion engine being non-EGR cylinders receiving intake air from an intake manifold and exhausting emissions through a main exhaust line;
a separate intake line for the D-EGR cylinder(s), providing intake air to the D-EGR cylinder independent of the intake manifold;
an EGR loop for delivering EGR from the D-EGR cylinder(s) to the main cylinders via the intake manifold;
an EGR exhaust line connecting the EGR loop to the main exhaust line;
wherein the D-EGR cylinder(s) is equipped with an air-assisted spark igniter, the air-assisted spark igniter having at least a body, a terminal at a first end of the body, a center electrode running through the body to a second end of the body, and a ground electrode also at the second end of the body, and further having an air passage running through at least a portion of the body and continuing through at least a portion of the ground electrode, the air passage having an inlet port for receiving pressurized air and having an exit port for expelling the pressurized air into a spark gap between the center electrode and the ground electrode.

12. The improved internal combustion engine of claim 11, further comprising an engine control unit configured to deliver the pressurized air to the spark igniter at a predetermined time prior to the ignition events.

13. The improved internal combustion engine of claim 12, wherein the predetermined time is within several milliseconds prior to an ignition event.

14. The improved internal combustion engine of claim 11, wherein the ground electrode has a curved portion at the spark gap and the exit port is on an inner side of the curved portion.

15. The improved internal combustion engine of claim 11, wherein the air-assisted spark igniter has a threaded portion of the body and wherein the air passage enters the spark igniter through the threaded portion via the inlet port.

16. The improved internal combustion engine of claim 11, further comprising a pre-chamber surrounding the spark gap.

* * * * *